United States Patent
Kanouda et al.

(10) Patent No.: US 7,495,415 B2
(45) Date of Patent: Feb. 24, 2009

(54) DC BACKUP POWER SUPPLY SYSTEM

(75) Inventors: Akihiko Kanouda, Hitachinaka (JP);
Minehiro Nemoto, Hitachi (JP);
Fumikazu Takahashi, Hitachi (JP);
Masahiro Hamaogi, Odawara (JP);
Yoshihide Takahashi, Odawara (JP);
Takashi Tanabe, Nakai (JP); Takao Gotou, Kawasaki (JP); Masato Isogai, Mito (JP); Toshikatsu Miyata, Suita (JP)

(73) Assignees: Hitachi, Ltd., Tokyo (JP); Hitachi Maxwell Ltd., Osaka (JP); Hitachi Computer Peripherals Co., Kanagawa-ken (JP)

( * ) Notice: Subject to any disclaimer, the term of this patent is extended or adjusted under 35 U.S.C. 154(b) by 0 days.

(21) Appl. No.: 11/130,123

(22) Filed: May 17, 2005

(65) Prior Publication Data
US 2005/0206242 A1 Sep. 22, 2005

Related U.S. Application Data

(63) Continuation of application No. 10/412,231, filed on Apr. 14, 2003, now abandoned.

(30) Foreign Application Priority Data
Apr. 16, 2002 (JP) ............................. 2002-113116

(51) Int. Cl.
*H02J 7/00* (2006.01)

(52) U.S. Cl. ........................ 320/112; 320/113; 307/66

(58) Field of Classification Search .................. 307/66; 320/106, 110, 112, 116, 125, 128, 132, 134, 320/135, 136, 113; 363/65
See application file for complete search history.

(56) References Cited

U.S. PATENT DOCUMENTS

| | | | | |
|---|---|---|---|---|
| 5,117,324 | A | * 5/1992 | Johnson, Jr. | 361/66 |
| 5,457,377 | A | 10/1995 | Jonsson | 324/430 |
| 5,504,415 | A | * 4/1996 | Podrazhansky et al. | 320/118 |
| 5,675,816 | A | 10/1997 | Hiyoshi et al. | 713/324 |
| 5,793,627 | A | 8/1998 | Caldes | 363/146 |
| 6,310,783 | B1 | 10/2001 | Winch | 361/797 |
| 6,380,713 | B2 * | 4/2002 | Namura | 320/112 |
| 6,381,156 | B1 * | 4/2002 | Sakai et al. | 363/65 |
| 6,414,403 | B2 * | 7/2002 | Kitagawa et al. | 307/66 |

(Continued)

FOREIGN PATENT DOCUMENTS

DE          42 37 835          5/1994

(Continued)

OTHER PUBLICATIONS

"Smart-UPS 1400 RM" Catalogue of APC Japan, Ltd.

*Primary Examiner*—Akm Enayet Ullah
*Assistant Examiner*—Aaron Piggush
(74) *Attorney, Agent, or Firm*—Antonelli, Terry, Stout & Kraus, LLP.

(57) ABSTRACT

A DC backup power supply system having a battery a charge-discharge circuit for charging and discharging a power between the battery and a DC line and a control circuit for controlling the charge-discharge circuit, wherein the battery has a number of battery cells and cylindrical portions of the battery cells are laid on an approximately horizontal plane.

22 Claims, 12 Drawing Sheets

U.S. PATENT DOCUMENTS

| | | |
|---|---|---|
| 6,448,743 B2 | 9/2002 | Sano ........................ 320/162 |
| 6,700,351 B2 * | 3/2004 | Blair et al. ................. 320/125 |
| 6,784,641 B2 * | 8/2004 | Sakai et al. ................ 320/132 |
| 6,917,124 B2 * | 7/2005 | Shetler et al. ............... 307/66 |
| 2001/0043051 A1 | 11/2001 | Namura |
| 2002/0186576 A1 | 12/2002 | Kanouda et al. ............. 307/66 |
| 2003/0227275 A1 | 12/2003 | Kishi ....................... 320/107 |
| 2003/0231009 A1 | 12/2003 | Nemoto |

FOREIGN PATENT DOCUMENTS

| | | | |
|---|---|---|---|
| GB | 2303979 | * | 3/1997 |
| JP | 06-217473 | | 8/1994 |
| JP | 07085891 | * | 3/1995 |
| JP | 09-322433 | | 5/1996 |
| JP | 10-056744 | | 8/1996 |
| JP | 09-117074 | | 5/1997 |
| JP | 2000-197347 | | 7/2000 |
| JP | 2002-101573 | | 4/2002 |

* cited by examiner

FIG. 8

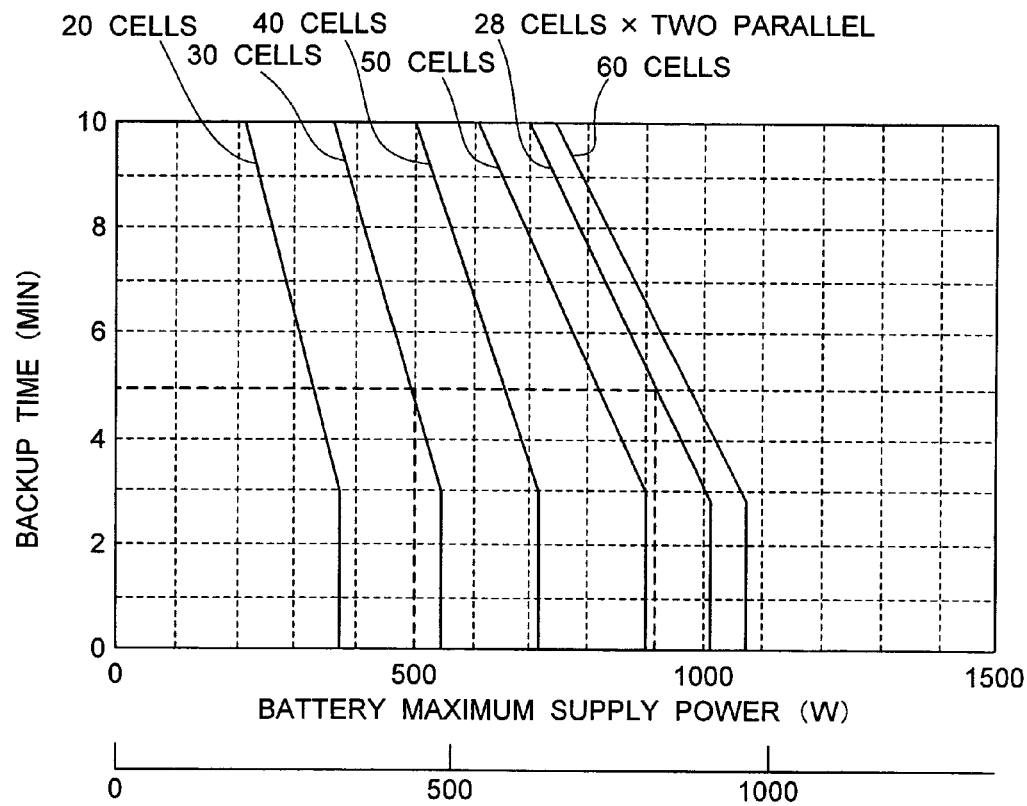

<CONDITIONS>
(1) SUB-C SIZE NiMH BATTERY
    CHARGE-DISCHARGE CIRCUIT EFFICIENCY 90%
(2) CELLS DETERIORATION
    (INCREASE OF IMPEDANCE TWICE INITIAL VALUE)
(3) LOW TEMPERATURE (10°C)

(a) CAPACITY OF 28 CELLS × TWO PARALLEL
    (TWO SYSTEMS IN 1U RACK)
   6 MIN BACKUP···BATTERY : 880W, BU POWER SUPPLY
                           SYSTEM OUTPUT : 790W
   5 MIN BACKUP···BATTERY : 920W, BU POWER SUPPLY
                           SYSTEM OUTPUT : 830W (b) CAPACITY OF 30 CELLS × 1 (THREE SYSTEMS IN 1U RACK)
   6 MIN BACKUP···BATTERY : 480W, BU POWER SUPPLY
                           SYSTEM OUTPUT : 430W
   5 MIN BACKUP···BATTERY : 500W, BU POWER SUPPLY
                           SYSTEM OUTPUT : 450W

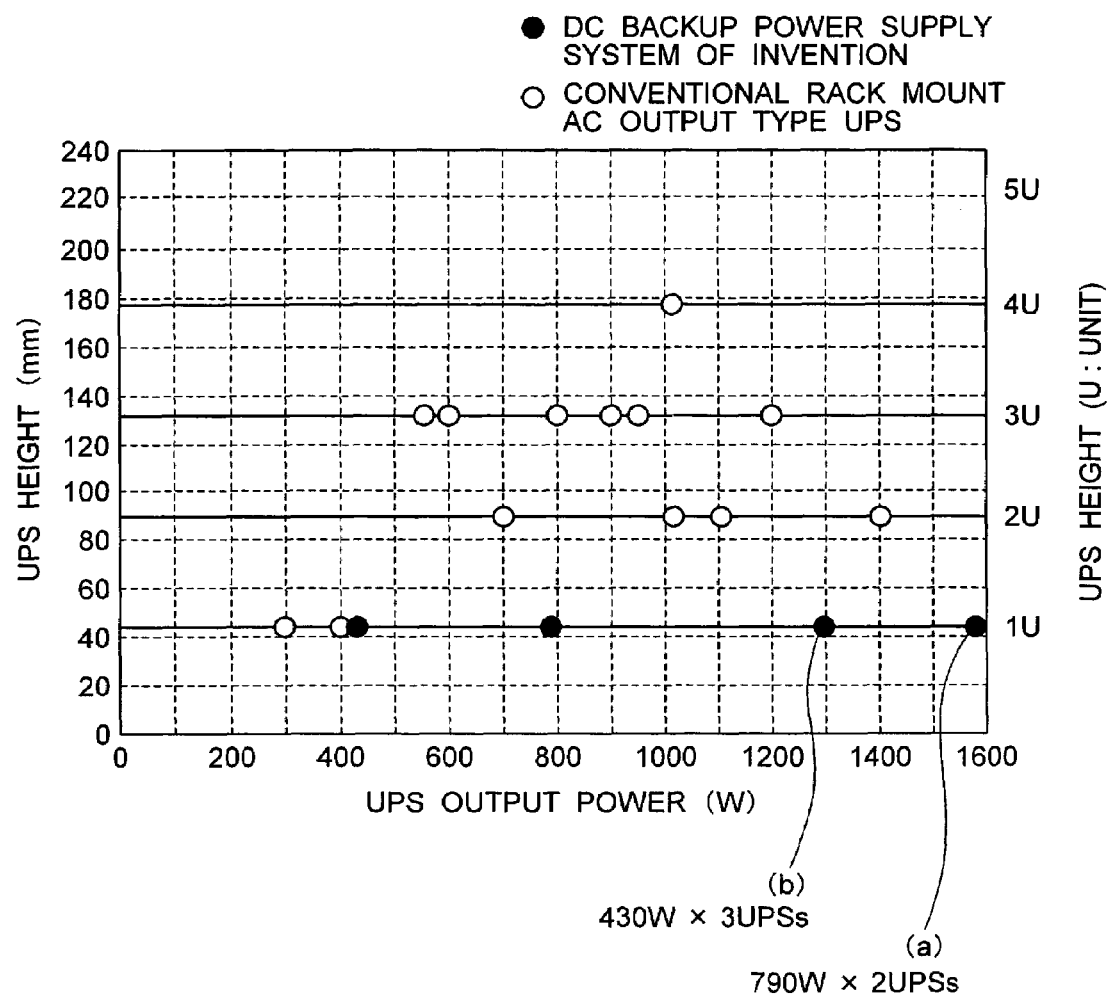

DC BACKUP POWER SUPPLY SYSTEM

CROSS-REFERENCE TO RELATED APPLICATIONS

This application is a continuation application of U.S. Ser. No. 10/412,231, filed Apr. 14, 2003, now abandoned, the contents of which are incorporated herein by reference, and the present application relates to subject matters described in the co-pending U.S. patent application Ser. No. 10/083,638 filed on Feb. 27, 2002 and co-pending U.S. patent application Ser. No. 10/412,319, filed Apr. 14, 2003, which is based on Japanese patent application No. 2002-113117 filed on Apr. 16, 2002 in Japan, and co-pending U.S. patent application Ser. No. 11/068,828, filed Mar. 2, 2005, which is a continuation application of U.S. Ser. No. 10/412,231.

BACKGROUND OF THE INVENTION

The present invention relates to a DC backup power supply system, and more particularly to a DC backup power supply system having a charge-discharge circuit for charging and discharging power between a battery and a DC line.

An uninterruptible power system (UPS) is externally installed on a so-called information processing apparatus such as a server, a router and a storage to deal with an unexpected power failure of a commercial AC power supply system and avoid damages such as data loss to be caused by the power failure. A rack-mount type UPS is commercially available which can be mounted on a rack having a width of about 480 mm called a 19-inch rack for information processing apparatuses. This rack has such a dimension as described, for example, in a "Smart-UPS" catalog of APC Japan, Ltd. This UPS is an AC backup power supply system which supplies an AC output power from a rechargeable battery to a load via an inverter and a transformer to retain the load operation.

Japanese Patent Laid-open Publication JP-A-2000-197347 discloses a DC backup power supply system to be used for a system in which a DC power is supplied from an AC power supply system to a load via an AC/DC converter and a DC/DC converter. In this Publication, it is proposed to connect the DC backup power supply system to an intermediate DC line between both the converters in order to increase the conversion efficiency and reduce the volume and cost.

Although a seal type lead battery generally used as a rechargeable battery of UPS is relatively inexpensive, it has a large volume and is difficult to be mounted on an information processing apparatus or the like. In addition, in order to retain the reliability of an information processing apparatus or the like, double or triple redundancy of a backup power supply system is required so that the size of UPS becomes larger and the mount issue becomes more serious.

Since a seal type lead battery contains lead, it is associated with the problem of adverse affects upon the environments if it is dumped as lead waste.

SUMMARY OF THE INVENTION

It is an object of the present invention to provide a compact DC backup power supply system. Specifically, a DC backup power supply system having a capacity of 1 to 1.4 kVA is made as compact as 45 mm height or lower to be able to be mounted in a 19-inch rack having a one unit (1U) size.

According to a first aspect of the present invention, a DC backup power supply system is provided which comprises: a battery; a charge-discharge circuit for charging and discharging a power between the battery and a DC line; and a control circuit for controlling the charge-discharge circuit, wherein the battery has a number of battery cells and cylindrical portions of the battery cells are laid on an approximately horizontal plane.

According to a second aspect of the present invention, used as the battery cell is a nickel-metal-hydride (NiMH) rechargeable battery cell having a high energy density.

With this constitution, a thin DC backup power supply system is realized having a number of nickel-metal-hydride battery cells of a sub-C size about 43 mm in height and about 22.5 mm in diameter.

In particular, in order to supply a rated output power of 700 W or larger per one DC backup power supply system, 40 or more nickel-metal-hydride battery cells are used, without using seal type lead battery cells which are the bottleneck of thinning the system. Two DC backup power supply systems can be accommodated in a space corresponding to one unit (1U) size of a 19-inch rack. In this case, it is preferable to connect at least two sets of nickel-metal-hydride battery cells in parallel.

If three DC backup power supply systems are accommodated in a space corresponding to 1U size of a 19-inch rack, the rated output power of 400 W or larger per each system can be obtained by using 20 or more sub-C size nickel-metal-hydride battery cells.

According to another aspect of the invention, the voltage at the DC line, i.e., at the connection point to the charge-discharge circuit, is set to 51 to 55 V if the full-charged voltage of the battery is 48 V or higher.

A rated output power is ensured for 6 minutes or longer to back up a load during power failure by using nickel-metal-hydride battery cells, under the conditions that a temperature of the battery is 10° C. or higher, an internal impedance of the battery is twice or lower than an initial value and the battery is in a full-charged state.

Other objects, features and advantages of the invention will become apparent from the following description of the embodiments of the invention taken in conjunction with the accompanying drawings.

BRIEF DESCRIPTION OF THE DRAWINGS

FIG. 8 is a graph showing the relation between a maximum supply power of the DC backup power supply system of the first embodiment and a backup time, by using the number of battery cells as a parameter.

FIG. 9 is a graph showing the relation between the height of UPS of the first embodiment and its output power, as compared to conventional UPSs.

DESCRIPTION OF THE EMBODIMENTS

Figure 1:
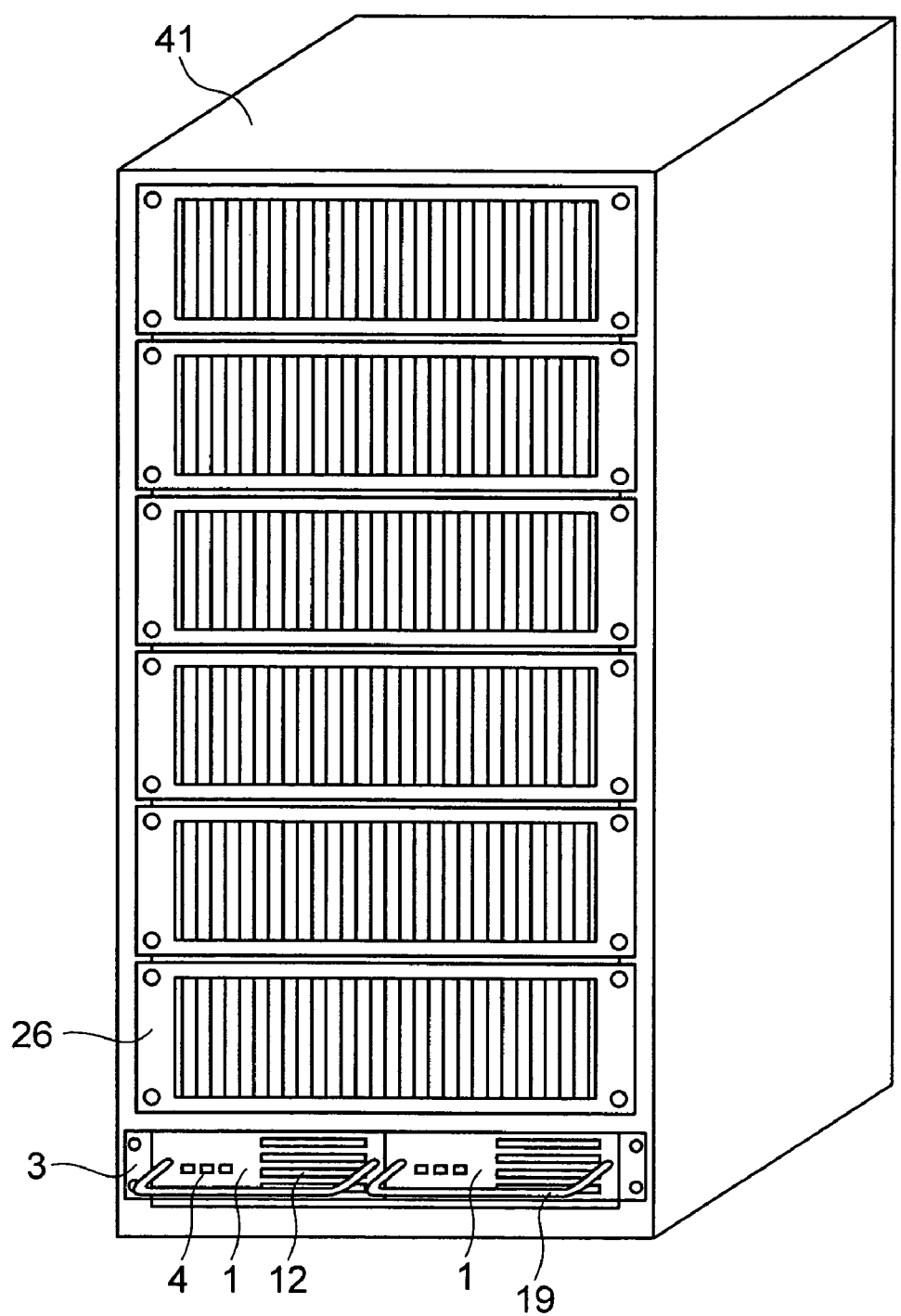
FIG. 1 is a perspective view of a rack in which mounted are DC backup power supply systems according to a first embodiment of the invention.

FIG. 1 is a perspective view showing the mount state of DC backup power supply systems (UPSs) according to a first embodiment of the invention and information processing apparatuses respectively mounted in a 19-inch rack. In FIG. 1, reference numeral 41 represents the 19-inch rack in which information processing apparatuses 26 are accommodated in a space corresponding to the height of 6 shelves×two units=12 units. Two DC backup power supply systems of the first embodiment are mounted in the lower most space corresponding to 1 unit. As seen from FIG. 1, the two DC backup power supply systems are accommodated in the small space. On the front side of the rack, reference numeral 3 represents a rack mount fitting, reference numeral 4 represents an LED, reference numeral 12 represents an air vent, and reference numeral 19 represents a drawer handle.

Figure 2:
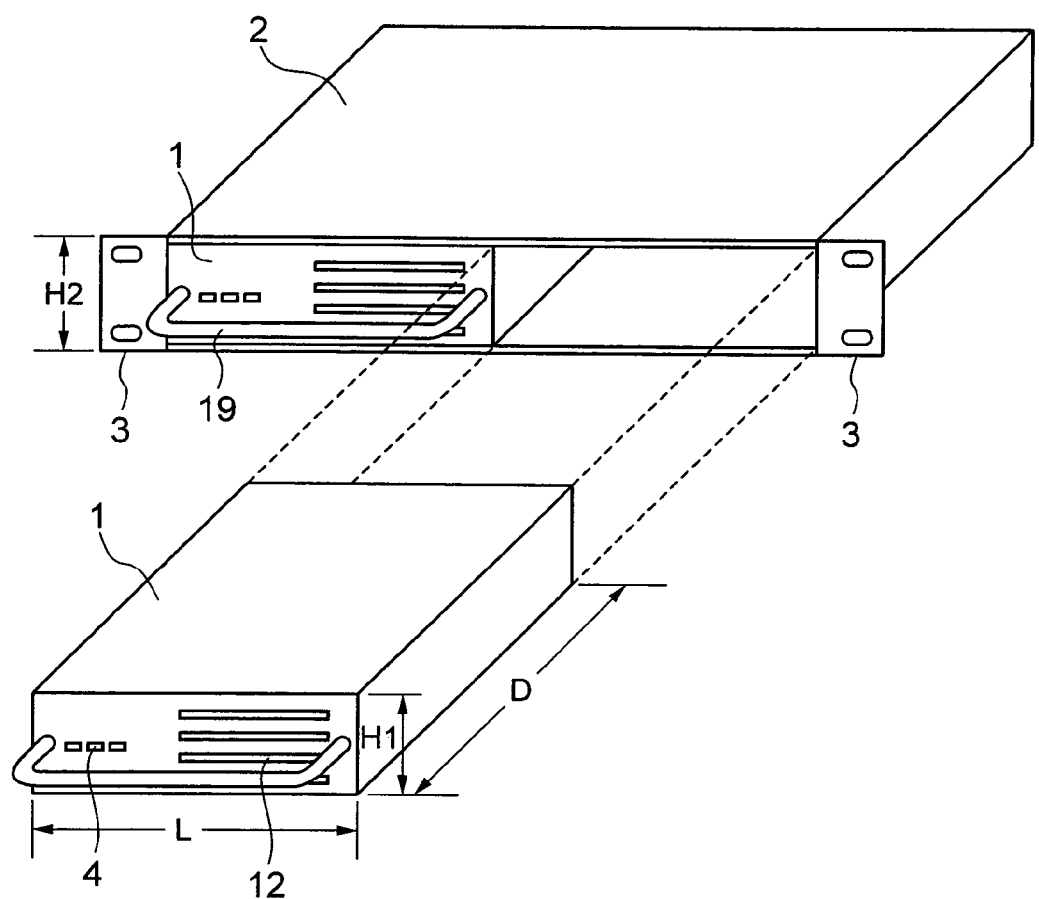
FIG. 2 is a perspective view of the DC backup power supply systems of the first embodiment.

FIG. 2 is a perspective view of the DC backup power supply system of the first embodiment. As shown, the DC backup power supply system 1 represents a single unit and has such a size that two DC backup power supply systems as two single units can be mounted side by side in a chassis 2 and each system as the single unit can be pulled out independently. The width L of the backup power supply system 1 is about 225 mm, the height H2 is 44 mm or lower and the depth D is 600 mm or shallower. The height H2 of the chassis is one unit (1U), i.e., about 44.45 mm which allows the chassis to be mounted in a 19-inch rack. The rack mount fitting 3 is mounted on the right and left sides of the chassis 2. LEDs 4, air openings 12 and drawer handle 19 are provided on the front side of the backup power supply system 1 as described earlier.

Figure 3:
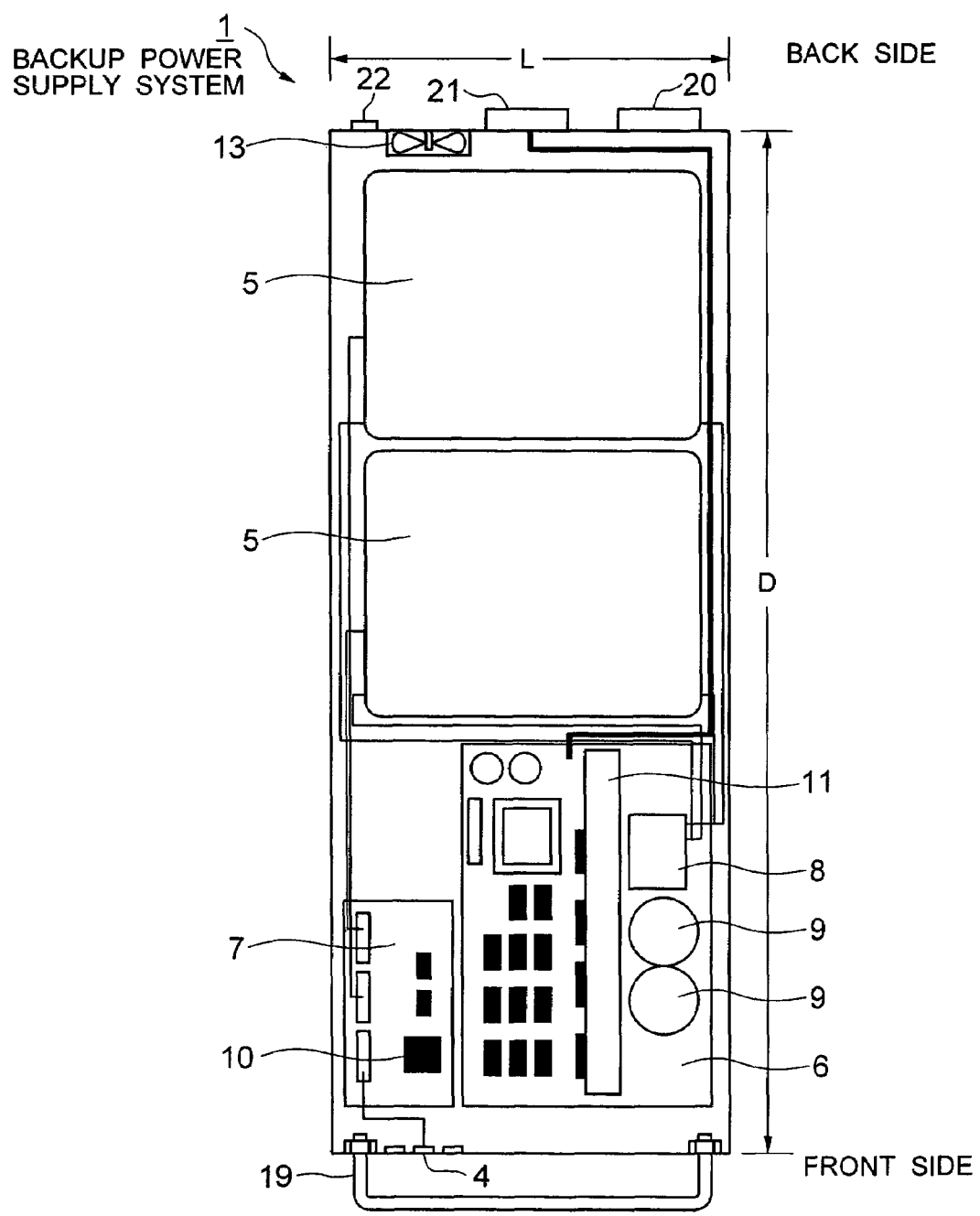
FIG. 3 is a plan view of the DC backup power supply system of the first embodiment.

FIG. 3 is a top view of the DC backup power supply system 1 with its lid being removed. In FIG. 3, similar constituent elements to those shown in FIGS. 1 and 2 are represented by using identical reference numerals. In FIG. 3, in each single unit 1, two battery packs 5 are juxtaposed along the depth direction. Mounted on the front side of these battery packs 5 are circuit boards for a charge-discharge circuit 6 having a coil 8, electrolytic capacitors 9 and a heat sink 11 and for a control circuit 7 having a microcomputer 10. Installed on the backside are a cooling fan 13, detachable connectors 20 and 21 and a switch 22.

Figure 4:
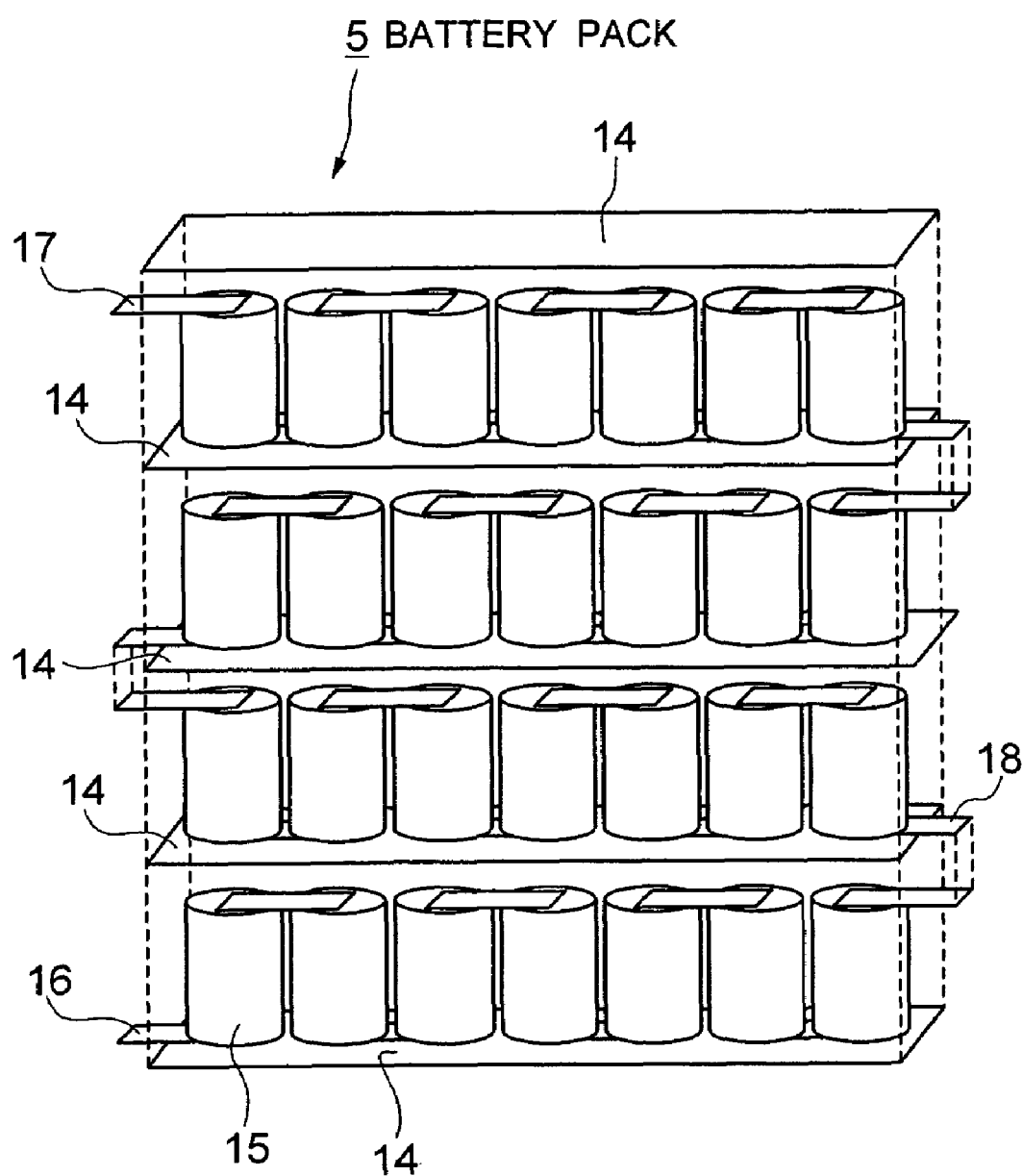
FIG. 4 is a perspective view showing the structure of a battery (pack) of the DC backup power supply system of the first embodiment.

FIG. 4 is a perspective view showing the structure of battery cells in the battery pack 5 used with the DC backup power supply system. In FIG. 4, seven battery cells are serially connected by conductive members 18 and disposed in a horizontal direction as viewed in FIG. 4, and four sets of such serial connections are disposed in a vertical direction. An insulated sheet 14 is disposed between adjacent battery cell sets. In this manner, twenty eight battery cells in total are all serially connected between a positive electrode 16 and a negative electrode 17. Each battery cell 15 is a sub-C size nickel-metal-hydride battery (NiMH battery) cell which is about 43 mm in height and about 22.5 mm in diameter. The size of the battery pack is about 160 mm in the horizontal direction, about 180 mm in the vertical direction and about 25 mm thick. The battery pack 5 is disposed in the backup power supply system, with its thickness direction being directed to the height direction of the backup power supply system, i.e., the cylindrical portion of the battery cell 15 is laid on an approximately flat plane. In this manner, the DC backup power supply system having a 1U size in height can be realized.

Figure 5:
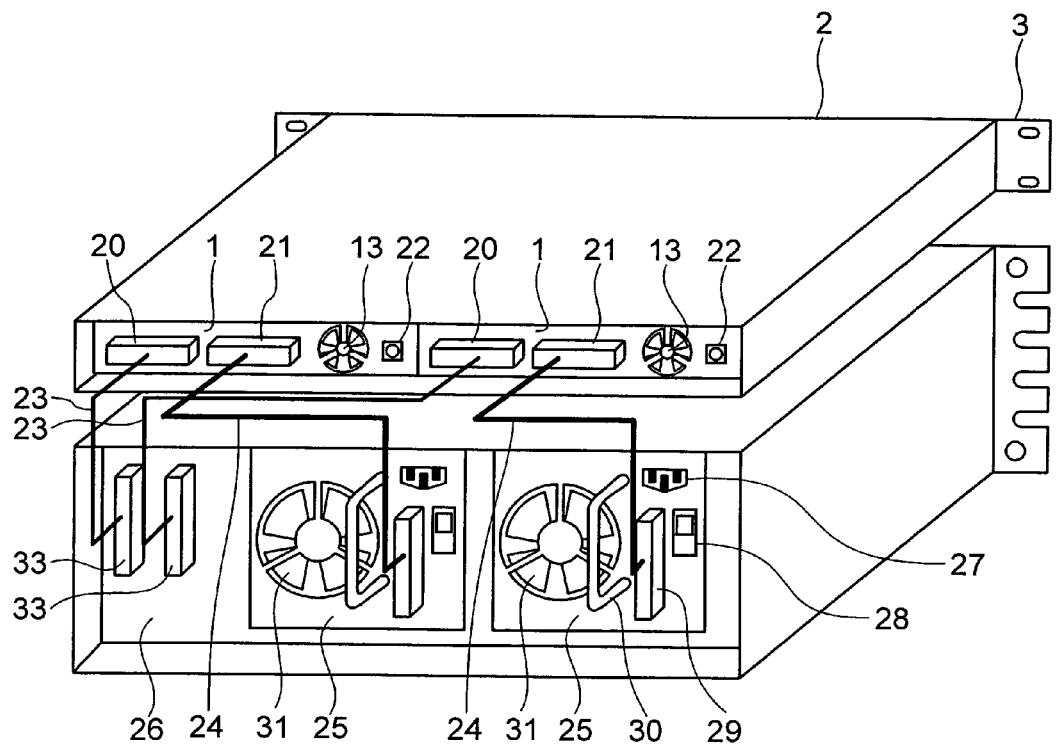
FIG. 5 is a perspective view showing the connection between the DC backup power supply systems of the first embodiment and an information processing apparatus, as viewed from the back of a rack.

FIG. 5 is a perspective view showing the connection between DC backup power supply systems of the first embodiment and an information processing apparatus, as viewed from the back of the rack. In FIG. 5, similar constituent elements to those shown in FIGS. 1 to 3 are represented by using identical reference numerals. On the back side of an information processing apparatus 26, two apparatus power sources 25 are installed. Installed on the back side of the apparatus power source 25 are an AC plug 27 and a power switch 28 as well as a connector 29, a handle 30 and a cooling fan 31. In addition to these components, on the back side of the information processing apparatus 26, two connectors 33 are installed. Two backup power supply systems are mounted in the chassis 2. The chassis 2 and information processing apparatus 26 are mounted in the same 19-inch rack. The apparatus power sources 25 and the backup power supply systems 1 are interconnected by the connectors 29 via DC power/signal cables 24 and connectors 21. The information processing apparatus 26 and backup power supply systems 1 are interconnected by the connectors 33 via signal cables 23 and connectors 20.

Heat is generated in the backup power supply systems 1 mainly during discharge. In such a case, the control circuits 7 make the cooling fans 13 rotate to blow air through a path from the front air vents 12 to the charge-discharge circuits 6, battery packs and to the cooling fans 13 to cool the backup power supply system 1.

Figure 6:
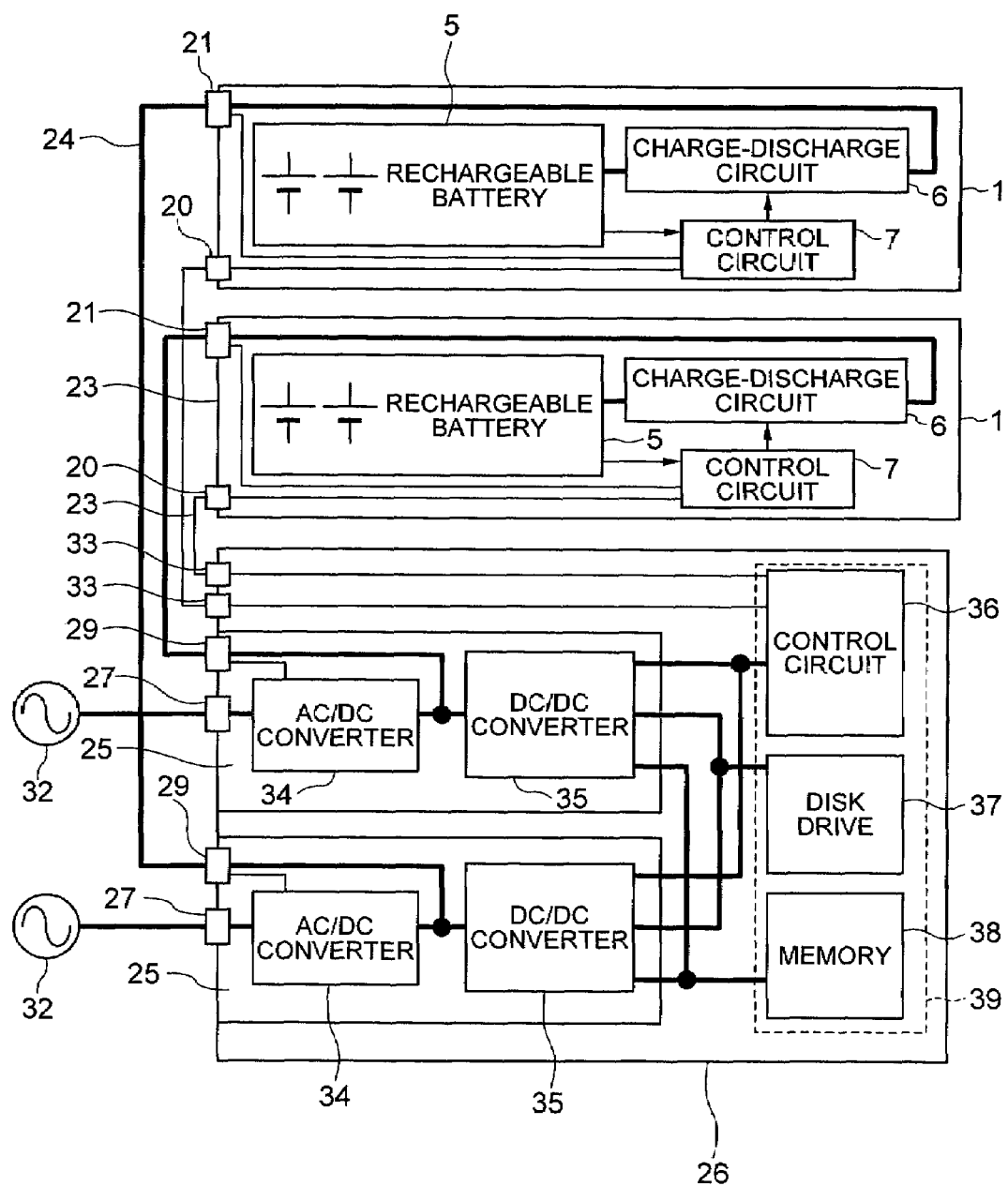
FIG. 6 is a block diagram showing the connection between the DC backup power supply systems of the first embodiment and an information processing apparatus.

FIG. 6 is a block diagram showing the electric connection between DC backup power supply systems 1 of the first embodiment shown in FIGS. 1 to 5 and an information processing apparatus 26. In FIG. 6, similar constituent elements to those shown in FIGS. 1 to 5 are represented by using identical reference numerals. The internal battery pack 5 of the backup power supply system 1 is connected to the charge-discharge circuit 6, and supplies/outputs a power/signal to the control circuit 7 for the charge-discharge circuit 6. An output terminal of the charge-discharge circuit 6 is connected to the detachable connector 21. The control circuit 7 is connected to the detachable connectors 20 and 21. As described with reference to FIG. 5, two apparatus power sources 25 are built in the information processing apparatus 26. Each of the apparatus power sources 25 has an AC/DC converter 34 and a DC/DC converter 35. An AC power source 32 supplies a DC power to a load 39 via the AC plug 27, AC/DC converter 34 and DC/DC converter 35. The two apparatus power sources 25 have quite the same structure and their outputs are connected in parallel to the load 39. The load 39 includes a control circuit 36, a disk drive 37 and a memory 38. The connection point between the AC/DC converter 34 and DC/DC converter 35 in the apparatus power source 25 is connected to the connector 29. A power-good signal from the AC/DC converter is supplied to the connector 29. The connector 29 is connected to the connector 21 of the backup power supply system 1 via the DC power/signal cable 24. The control circuit 36 in the load 39 is connected to the connector 33 and to the connector 20 of the backup power supply system 1 via the signal cable 23.

The control circuit 7 always monitors the state of the battery pack to control a charge current of the charge-discharge circuit. When the battery pack 5 enters a full-charged state, the control circuit 7 controls to stop the operation of the charge-discharge circuit 6. The two backup power supply systems 1 have the same structure and independently monitor the states of the battery packs 5 to perform charge control. By stopping the operation of the charge-discharge circuit 6 in the full-charged state, a so-called trickle charge can be prevented and the life time of each nickel-metal-hydride battery cell can be prolonged.

Consider now the charge of nickel-metal-hydride battery cells 15 of 25 cells ×two parallel sets=56 cells. A cell having a nominal voltage of 1.2 V rises to 1.6 V in the full-charged state. A voltage across the battery back 5 having 28 cells is therefore 44.8 V. In this case, if the setting voltage of the intermediate DC line 29, i.e., the setting voltage at the output terminal 21 of the backup power supply system 1, is set around 48 V, it becomes impossible to retain the terminal voltage of 44.8 V of the battery pack 5, because of a variation in the DC output voltage to be caused by the control error ±10% of the AC/DC converter 34 and by a circuit voltage drop. In the embodiment of the invention, therefore, the center value (design value) of the voltage of the intermediate DC line 29 is set to 54 V with some margin to thereby reliably maintain the charge voltage even under such variation and voltage drop. There is generally no practical problem if the center value is set to 51 to 55 V.

Figure 7A:
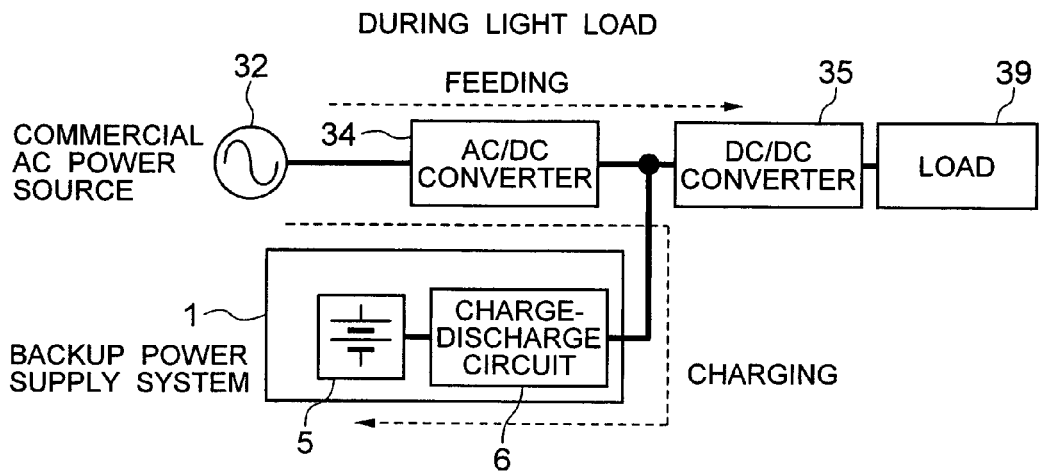
FIGS. 7A, 7B and 7C are block diagrams illustrating the operation state of the DC backup power supply system according to an embodiment of the invention.
Figure 7B:
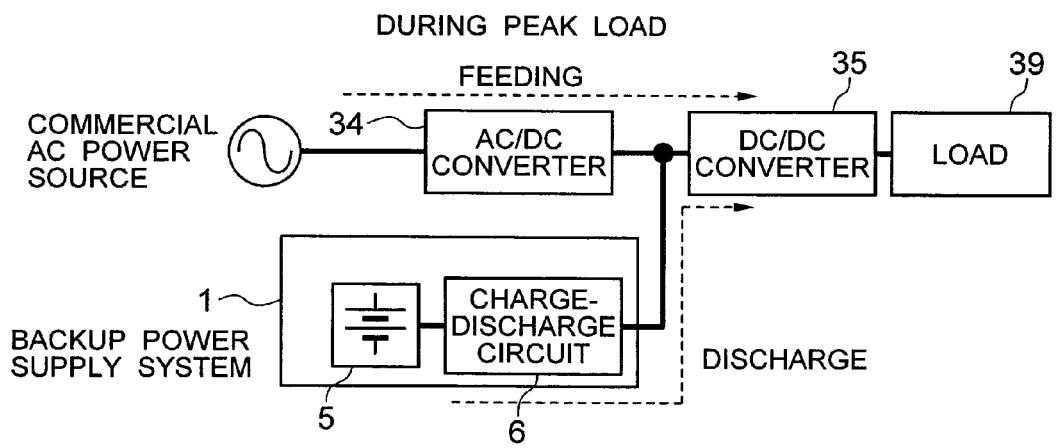
Figure 7C:
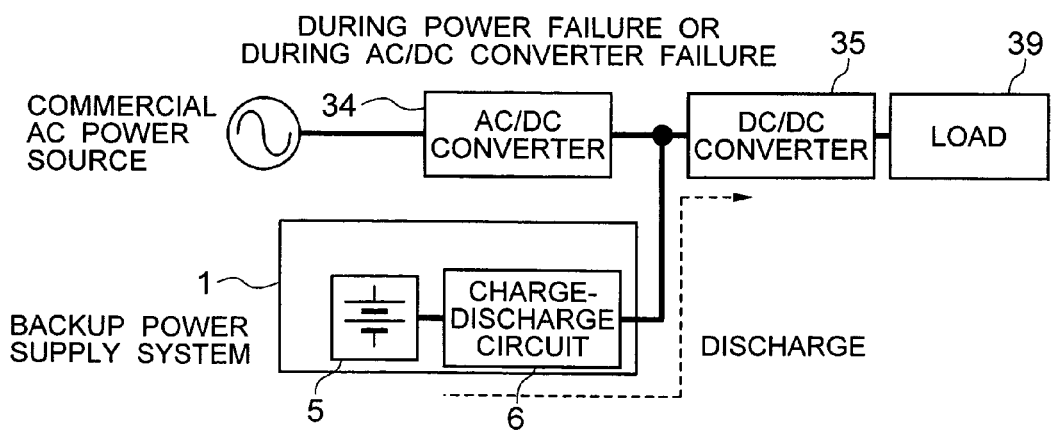

FIGS. 7A, 7B and 7C are simplified block diagrams illustrating the operation state of the DC backup power supply system of the embodiment. In FIG. 7, similar constituent elements to those shown in FIGS. 1 to 6 are represented by using identical reference numerals. As already described with FIG. 6, although two series of commercial AC power sources 32 are used, the same AC power source may be used. One of the two AC power sources may be an electric generator or a large capacity uninterrupted power source. While both the commercial power sources 32 are in a normal state, the backup power supply system 1 are in a charge state or a standby state.

FIG. 7A is a block diagram illustrating the operation during a charge state. There are two power paths. The first power path is a path for supplying a power from the commercial AC power source 32 to the load 39 via the AC/DC converter 34 and DC/DC converter 35. The second power path is a path for charging the battery pack 5 from the output point of the AC/DC converter 34 via the charge-discharge circuit 6 of the backup power supply system 1. It is preferable that the voltage at the output point of the AC/DC converter 34 is about DC 48 V (or 51 to 55 V as described earlier). Although a lower voltage of 12 V or 24 V, which is lower as compared to the power capacity of the load 39, may be used, the current increases correspondingly so that the DC power/signal cable 24 is required to be thick.

The voltage at the output point may be set to DC 380 V which is an output of a phase factor circuit (PFC) built in a general AC/DC converter. In this case, however, it is to be noted that as compared to the 48 V (or 51 to 55 V as described earlier) series, the insulation of the backup power supply system and DC power/signal cable 24 becomes difficult.

FIG. 7B is a block diagram showing the power paths under a peakcut function according to the embodiment. This peakcut function provides a control means for supplying a power also from the backup power supply system 1 in addition to a power supplied from the AC/DC converter 34 when a load current over a predetermined value flows through the DC/DC converter 35 while the commercial AC power source 32 is normal. This control means is constituted of the charge-discharge circuit 6 and control circuit 7. It is therefore possible to suppress the output current of the AC/DC converter 34 equal to or lower than the predetermined value. A user can have the merits that the rated capacity of the AC/DC converter can be suppressed lower, current input from the commercial AC power source 32 can be suppressed smaller, power equalization is realized and contract electric power can be reduced.

FIG. 7C shows the power paths during power failure. In this embodiment, the discharge operation starts when a change in the power-good signal is received from the AC/DC converter 34. It is therefore possible to back up the power supply to the load in response to not only power failure but also AC/DC converter failure, both in the same manner. The reliability of the system can be improved.

The operation will be described which is made when the commercial AC power source 32 fails. As the commercial AC power source 32 fails, an output voltage of the AC/DC converter 34 lowers. At this time, the power-good signal supplied from the AC/DC converter changes to an abnormal state signal. This change is similarly applied to failure of the AC/DC converter 34. This change in the power-good signal is electrically sent to the control circuit 7 of the backup power supply system 1 via the connector 29, DC power/signal cable 24 and connector 21. Upon reception of this change in the power-good signal, the backup power supply system 1 starts the discharge operation of the charge-discharge circuit 6. The DC power of the battery pack 5 is converted into the predetermined 48 V (or 51 to 55 V as described earlier) by a boost converter of chopper in the charge-discharge circuit 6, the converted voltage being applied to the output point of the AC/DC converter 34. The boost converter of chopper is made of a well-known circuit constituted of the coil 8, a semiconductor device such as a power MOSFET mounted on the heat sink 11 and the electrolytic capacitors 9.

As described with reference to FIG. 4, the battery packs 5 of the embodiment are made of two parallel connections of a serial connection of twenty eight nickel-metal-hydride battery cells. Although the voltage across the battery packs 5 changes from time to time, the rated voltage is 33.6 V (1.2 V/cell). Although there are some power conversion circuits for generating a stable 48 V (or 51 to 55 V as described earlier) from the battery pack, the above-described boost converter of chopper among others is most simple.

FIG. 8 is a graph showing the relation between maximum supply powers of the DC backup power supply system and the battery and a backup time, by using the number of nickel-metal-hydride battery cells as a parameter. This graph was obtained by using nickel-metal-hydride (NiMH) battery cells of the sub-C size under the severe conditions of a charge-discharge circuit efficiency of 90%, a cell deterioration with an internal impedance twice the initial value, and a low temperature of 10° C. As seen from this graph, in order to obtain a backup power supply system capable of backing up for 6 minutes at an output power of 700 W, battery cells between 40 cells and 50 cells are required. The graph shown in FIG. 8 shows an output under the worst conditions described above. In the initial state of battery cells, 40 cells are sufficient for the backup for 6 minutes at an output power of 700 W. For the application that requires the reliable backup for 6 minutes at an output power of 700 W under the worst conditions, it is desired to use 45 or more battery cells.

Similarly, as seen from FIG. 8, 20 to 30 cells are required for the backup for 6 minutes at an output power of 400 W or for 5 minutes for an output power of 500 W (indicated by broken line). From the same reason described above, it is necessary to use 20 cells or more, or more preferably about 28 cells.

FIG. 8 also shows the backup capacity of the DC backup power supply system using 28 cells×two parallel connections=56 cells of the nickel-metal-hydride battery cells 15 of the first embodiment. The same severe conditions were applied, i.e., the conditions of a charge-discharge circuit 6 efficiency of 90%, a cell deterioration with an internal impedance twice the initial value, and a low temperature of 10° C. As seen from the graph, the maximum backup output is about 100 W×3 min or shorter, about 920 W×5 min (indicated by a broken line), about 880 W×about 6 min, or about 880 W×about 6 min which is about 790 W×6 min when the power supply system efficiency is taken into consideration. These output capacities sufficiently surpass that a general 1 kVA AC type UPS can backup 670 to 700 W×6 min in the initial state, and are compatible with the specification that a 1.2 kVA AC output type UPS can back up 840 W×6 min in the initial state. The backup power supply system of the first embodiment has the backup capacity generally equivalent to that of the 1.2 kVA AC output type UPS.

In the backup power supply system 1 of the invention, the efficiency of the backup power supply system 1 can be improved more than an AC output type UPS by the amount corresponding to the efficiency of the AC/DC converter because the AC/DC converter does not feed power during the backup. In other words, the backup power supply system having the same capacity as that of an AC output type UPS can prolong the backup time more than AC output type UPS by the amount corresponding to the efficiency of the AC/DC converter. For example, assuming that the efficiency of an AC/DC converter is 90% and the backup time of an AC output type UPS is 6 min, then the backup time of a backup power supply system having the same capacity becomes 6 min/0.9=6.6 min.

In this embodiment, the switching from a power failure to an output of 48 V (or 51 to 55 V as described earlier) can be performed in several hundreds μs. Therefore, an input to the DC/DC converter 35 does not change greatly so that the DC/DC converter 35 operates independently from the power failure. The load 39 can continue its operation stably.

If power failure is recovered in relatively short time and the commercial AC power source 32 recovers, the power-good signal of the AC/DC converter 34 changes from the abnormal state to the normal state. This signal change is detected by the control circuit 7 to stop the discharge.

The remaining capacity (SOC) of the battery pack is always monitored by the control circuit 7. SOC can be estimated mainly through cumulative addition of charge current or discharge current to and from the battery pack 5. If SOC of the battery pack 5 lowers because of long power failure, the control circuit 7 outputs a shut-down signal to the control circuit 36 which in turn enters a shutdown operation. This operation is, for example, an operation of saving the contents of the memory 38 into the disk 37.

After the shutdown operation, the control circuit 36 sends an UPS shutdown signal to the control circuit 7 which in turn stops the discharge of the battery pack.

Next, the description will be made on the operation to be executed when the backup power supply system 1 fails. When the backup power supply system 1 fails, the control circuit 7 stops the operation of the charge-discharge circuit 6 and indicates an alarm on LEDs 4. Although not shown, this alarm may be effected by using a buzzer built in the backup power supply system 1. A failure of the backup power supply system 1 may be notified to the control circuit 36 to notify it to the user from the system side. After the user recognizes the failure of the backup power supply system 1 in this manner, the backup power supply system 1 is replaced with a new one. In the replacement process of the backup power supply system 1, the switch 22 on the back side is turned off and the cables are pulled out to draw out the system with the handle 19. Next, the normal backup power supply system 1 is inserted as shown in FIGS. 1 and 2, and the cables and the like are wired to the connectors to thereafter turn on the switch as shown in FIG. 3. In this case, the operation of the information processing apparatus as the load is not required to be stopped. In this embodiment, as shown in FIG. 6, since the backup power supply systems 1 are connected in parallel to the path from the commercial AC power source 32 to the load 39, the backup power supply system 1 can be pulled out or inserted while the load is maintained to operate so that by disconnecting and connecting the connectors and cables for at least one of the backup power supply systems of FIG. 6, each of the backup power supply systems can be replaced while the normal AC system is operational representing electric hot swap connections.

FIG. 9 is a graph showing the size of the DC backup power supply system of the first embodiment as compared with the sizes of commercially available several rack mount type AC output type UPSs. This graph shows the relation between the output power W of the backup power supply system and a UPS height. As plotted by white circles in FIG. 9, since the height of a rack mount AC output type UPS is generally about 44 mm (1U), about 88 mm (2U), and so on because the height pitch of 19-inch racks is about 44.45 mm (1U). An AC output type UPS having the lowest height of 1U exists only for a relatively small output power of 400 W or smaller because there is a bottleneck of reducing the volume of a transformer, an inverter and a seal type lead battery. Each of rack mount AC output type UPSs of 1 to 1.4 kVA (approximately corresponding to 700 to 1000 W), which are manufactured in large units, has a height of 2U to 3U. Information processing apparatuses are becoming thinner year after year in order to increase the packaging density. 1U size servers have been presented recently and there is a high need of increasing the packaging density of the whole of a rack.

As plotted by a black circle (a) in FIG. 9, according to the first embodiment, two rack mount DC output type UPSs of 1 to 1.4 kVA (approximately corresponding to 700 to 1000 W), which are manufactured in large units, can be accommodated in a 1U space.

A DC backup power supply system according to the second embodiment of the invention will be described with reference to FIGS. 10 to 12.

Figure 10:
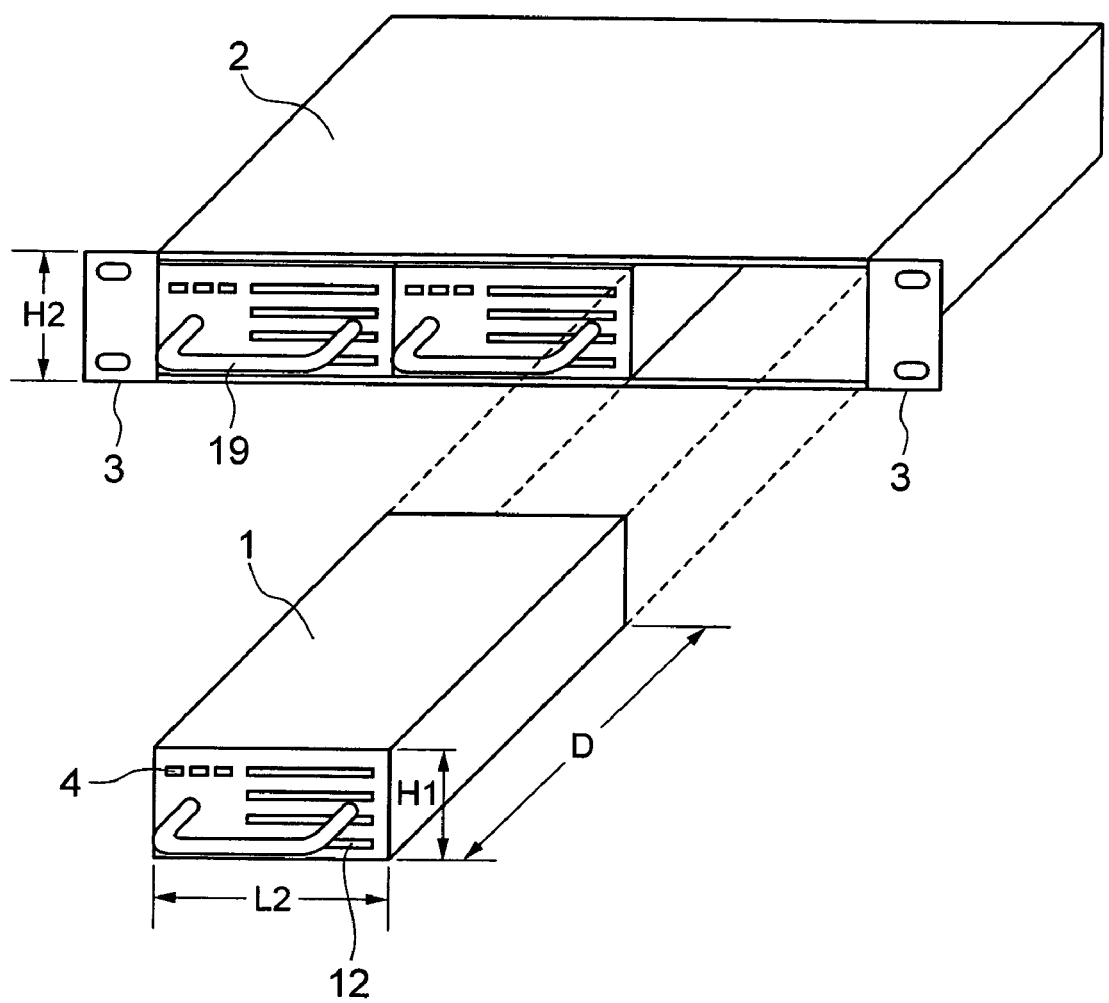
FIG. 10 is a perspective view of DC backup power supply systems according to a second embodiment of the invention.

FIG. 10 is a perspective view of DC backup power supply systems according to a second embodiment of the invention. This structure is basically the same as that shown in FIG. 2, and so only different points will be described. In the example shown in FIG. 10, three backup power supply systems can be mounted on a chassis 2. The height H2 of the chassis 2 is 1U which is the same as FIG. 1. The height H1 of the backup power supply system 1 is 44 mm or lower which is the same as FIG. 1. The width L2 of the backup power supply system 1 is 150 mm or shallower.

Figure 11:
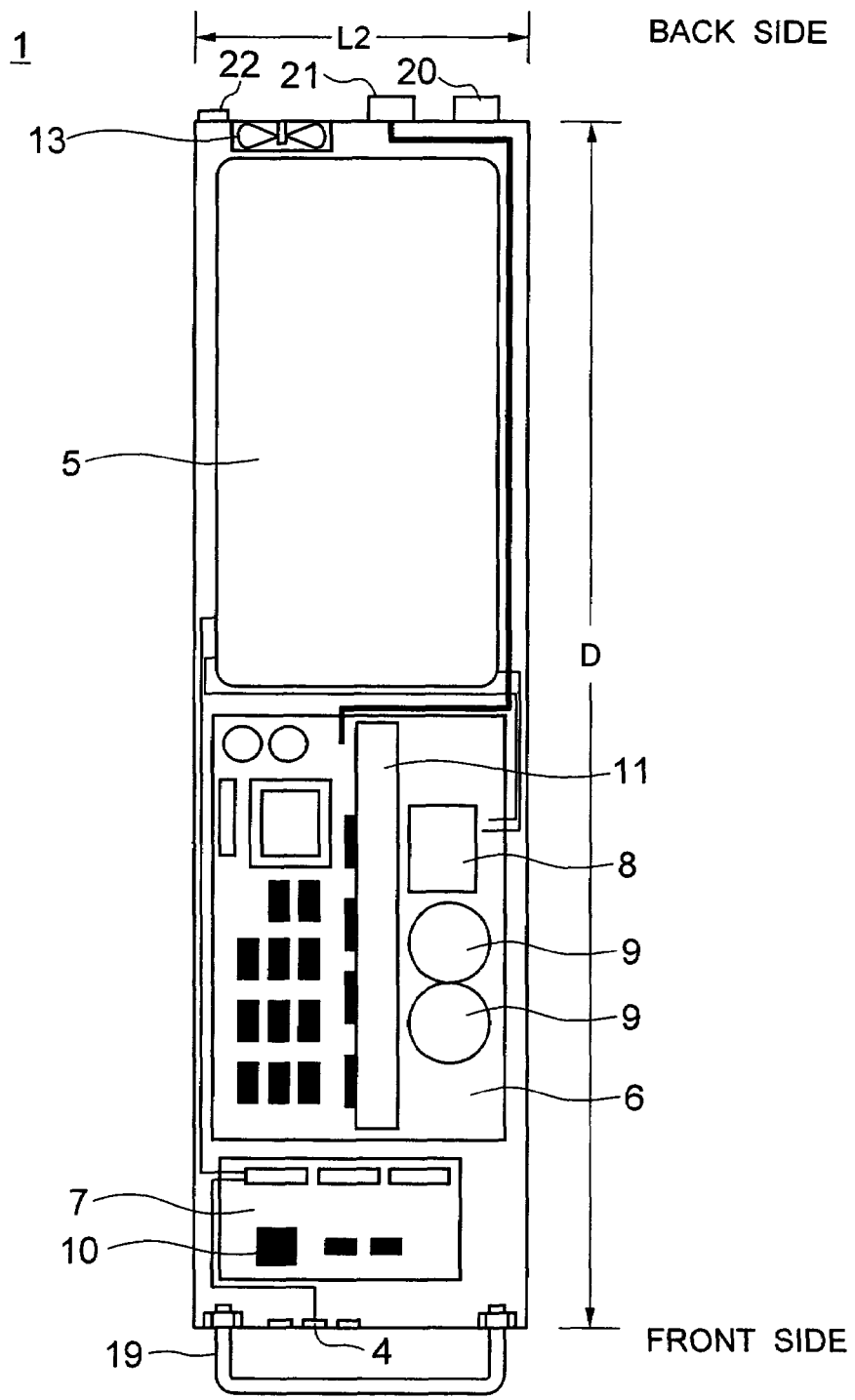
FIG. 11 is a plan view of the DC backup power supply system of the second embodiment.

FIG. 11 is a plan view showing the internal structure of the DC backup power supply system 1 of the second embodiment. Although the sizes of the charge-discharge circuit 6 and control circuit 7 are the same as those shown in FIG. 3, L2 is narrow, 150 mm or narrower so that the control circuit 7, charge-discharge circuit 6 and battery pack 5 are disposed in this order from the front side.

Figure 12:
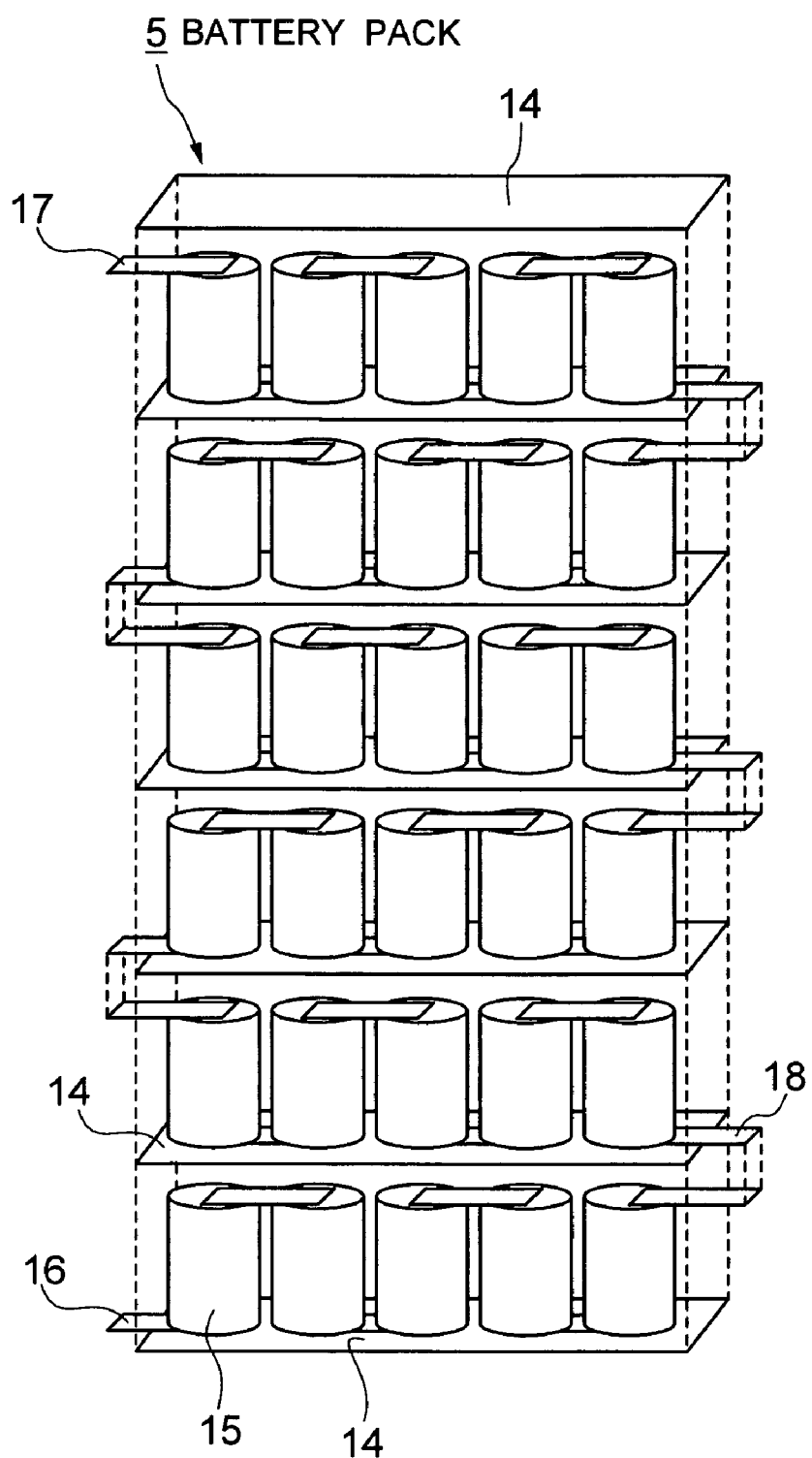
FIG. 12 is a perspective view showing the structure of a battery (pack) of the DC backup supply system of the second embodiment.

FIG. 12 is a perspective view showing the internal structure of the battery pack 5. The battery pack 5 is constituted of thirty sub-C size nickel-metal-hydride battery cells serially connected, without a parallel connection of battery packs 5.

Five battery cells are arranged in one row and six battery rows are stacked in the vertical direction, with an insulated sheet 14 being sandwiched between adjacent battery cell rows. A positive electrode 16 and a negative electrode 17 are provided on opposite ends of the cell array structure. The size of this battery pack is about 270 mm in the vertical direction, about 115 mm wide and about 25 mm thick. This battery pack can be accommodated in a space having the size shown in FIG. 11.

The operation of the backup power supply system 1 of the second embodiment is the same as that of the first embodiment. The capacity per one backup power supply system is different between the first and second embodiments. This point will be described with reference to FIG. 8. The battery pack 5 contains thirty sub-C size nickel-metal-hydride battery cells. The following maximum backup outputs can be obtained under the conditions of a charge-discharge circuit 6 efficiency of 90%, a cell deterioration with an internal impedance twice the initial value, and a low temperature of 10° C. As seen from the graph, the maximum backup output is about 550 W×3 min or shorter, or about 480 W×about 6 min which is about 430 W×6 min when the power supply system efficiency is taken into consideration. These output capacities surpass the output power of a 500 VA (350 W) AC output type UPS and are compatible with the initial performance of a 700 VA (490 W) AC output type UPS. The backup power supply system 1 of the second embodiment has the ability to back up the capacity guaranteed as the initial value of the 700 VA AC output type UPS.

As plotted by a black circle (b) in FIG. 9, three DC backup power supply systems 1 of the second embodiment having the backup ability of 430 W×6 min can be accommodated in the space corresponding to one unit (1U) size of a 19-inch rack.

Each of thirty nickel-metal-hydride battery cells 15 has 1.6 V near the full-charged state. The voltage across the terminals of the battery pack 5 is therefore 30×1.6 V=48 V. In this case, the setting voltage at the intermediate DC line 29, i.e., the setting voltage at the output terminal 21 of the backup power supply system 1, is required to be set to a voltage at least higher than by an amount corresponding to the circuit voltage drop. Also in the second embodiment, the voltage at the intermediate DC line 29 is set to 54 V so that the charge voltage can be retained with some margin even if there are the regulation variation of the AC/DC converter 34 and the circuit voltage drop.

Also in the backup power supply system of this embodiment, each function of charge, discharge and peakcut can operate in the similar manner as that of the first embodiment.

According to the above-described embodiments, by replacing a rack mount AC output type UPS by a backup power supply system of the embodiments, the backup function of the same capacity can be realized by a thinner size, 1U size. It becomes possible to increase the number of load systems such as systems, information processing apparatuses and servers. The capacity of such a load system can be increased so that the packaging density of a rack can be increased.

Also in the above embodiments, when rechargeable battery cells and other components in the backup power supply system are to be maintained and replaced, each backup power supply system can be hot-swapped through connection and disconnection of the connectors and cables on the back side. Replacement works can be performed while the load is maintained to operate and is not turned off.

With the peakcut function of the backup power supply system, it is possible to realize input power equalization and reduce a contract electric power, a rated capacity of the AC/DC converter and a cost.

By using not a seal type lead battery but a nickel-metal-hydride battery, the environment load when lead is otherwise dumped can be mitigated and a safe system can be provided.

According to the invention, a DC backup power supply system can be realized in a thin size and can be mounted easily on a rack having systems, information processing apparatuses, servers and the like.

If a seal type lead battery is not used but a nickel-metal-hydride battery is used, the environment load when lead is otherwise dumped can be mitigated and a safe system can be provided.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A DC backup power supply system for supplying DC power to a load, comprising:
    an AC/DC converter for converting AC power to DC power;
    a DC/DC converter coupled to an output of the AC/DC converter for converting the DC power to DC power to be supplied to the load; and
    at least one DC backup power supply unit which includes a battery to supply backup DC power;
    a charge-discharge circuit for controlling an output of the battery; and
    a control circuit for controlling the charge-discharge circuit;
    wherein the battery, the charge-discharge circuit and the control circuit are electrically connected and arranged so as to form the DC backup power supply unit as a single unit;
    wherein the DC backup power supply unit is connected via a detachable connector in parallel to a path from the AC/DC converter to the DC/DC converter at a connecting point between an output of the AC/DC converter to an input of the DC/DC converter and the input of the DC/DC converter, without a transformer between the DC backup power supply unit and the input of the DC/DC converter, so as to supply the backup DC power to the load through the DC/DC converter and to receive the DC power from the AC/DC converter via the path and the connecting point, and is configured so that the DC backup power supply unit is detachable while the load is maintained operational without interruption of DC power supplied from the DC/DC converter; and
    wherein the battery has a number of battery cells, cylindrical portions of the battery cells are laid on an approximately horizontal plane, and the battery is accommodated in a space having a height corresponding to one unit (1U) size of a 19-inch rack.

2. A DC backup power supply system according to claim 1, wherein the battery has a number of battery cells, cylindrical portions of the battery cells are laid on an approximately horizontal plane, and a height of the battery is not greater than 45 mm.

3. A DC backup power supply system according to claim 1, wherein two DC backup power supply units each having a rated output power of at least 700 W are accommodated side by side in the space having the height corresponding to the one unit (1U) size.

4. A DC backup power supply system according to claim 1, wherein the battery has at least 40 sub-C size nickel-metal-hydride battery cells.

5. A DC backup power supply system according to claim 4, wherein the nickel-metal-hydride battery cells include at least two parallel connections of nickel-metal-hydride battery cells.

6. A DC backup power supply system according to claim 1, wherein three DC backup power supply units each having a rated output power of at least 400 W are accommodated side by side in the space having the height corresponding to the one unit (1U) size.

7. A DC backup power supply system according to claim 6, wherein the battery has at least 20 sub-C size nickel-metal-hydride battery cells.

8. A DC backup power supply system according to claim 1, wherein when a full-charged voltage of the battery is not greater than 48 V, a voltage at a DC line is set at a voltage at least equal to the voltage of the full-charged voltage of the battery.

9. A DC backup power supply system according to claim 3, wherein the rated output power is supplied for at least 6 minutes under the conditions that a temperature of the battery is at least 10° C., an internal impedance of the battery is not greater than twice an initial value and the battery is in a full-charged state.

10. A DC backup power supply system for a load normally supplied with DC power, comprising:
  a DC power supply for supplying DC power to the load; and
  at least one DC backup power supply unit which includes a battery to supply backup DC power;
  a charge-discharge circuit for controlling an output of the battery; and
  a control circuit for controlling the charge-discharge circuit;
  wherein the battery has a number of battery cells, cylindrical portions of the battery cells being laid on an approximately horizontal plane;
  wherein the battery, the charge-discharge circuit and the control circuit are electrically connected and arranged so as to form the DC backup power supply unit as a single unit; and
  wherein the at least one DC backup power supply unit is connected via a detachable connector in parallel to a path from the DC power supply to the load at a connecting point between an output of at least a part of the DC power supply to an input of the load and the input of the load, without a transformer between the DC backup power supply unit and the input of the load, so as to supply the backup DC power to the load and to receive the DC power from the DC power supply via the path and the connecting point, and is configured so as to enable replacement of the at least one DC backup power supply unit while the load is maintained operational by supply of DC power from the DC power supply.

11. A DC backup power supply system according to claim 1, further comprising control means, and when a power supplied from a DC line and consumed by the load exceeds a predetermined value, the control means activates the at least one DC backup power supply unit to supply power to the load.

12. A DC backup power supply system according to claim 1, wherein the DC backup power supply unit is connected to a junction between an output to of the AC/DC converter and an input of the DC/DC converter so that the DC backup power supply unit supplies the backup DC power directly to the input of the DC/DC converter and receives the DC power directly from the output of the AC/DC converter.

13. A DC backup power supply system according to claim 1, wherein the battery has a number of battery cells and cylindrical portions of the battery cells are laid on an approximately horizontal plane.

14. A DC backup power supply system according to claim 13, wherein the battery cells are arranged so that an electrode of one battery cell is adjacent to an electrode of an adjacent battery cell.

15. A DC backup power supply system according to claim 1, wherein a height of the charge-discharge circuit and the control circuit is less than 44 mm.

16. A DC backup power supply system according to claim 1, wherein the battery is arranged in the DC backup power supply unit so that a space is delimited with respect to the battery through which cooling air passes.

17. A DC backup power supply system according to claim 10, wherein a plurality of DC backup power supply units are provided, each of the plurality of DC backup power supply units having the detachable connector.

18. The DC backup power supply system according to claim 10, wherein AC is supplied to the load through a AC/DC converter and a DC/DC converter forming part of the DC power supply, and the at least one DC backup power supply unit is connected to the connecting point at a junction between the AC/DC converter and the DC/DC converter for supplying power to the load through the DC/DC converter so that the DC backup power supply unit supplies the backup DC power directly to the DC/DC converter and receives the DC power directly from the AC/DC converter.

19. A DC backup power supply system according to claim 10, wherein the battery has at least 40 sub-C size nickel-metal-hydride battery cells.

20. A DC backup power supply system according to claim 19, wherein the nickel-metal-hydride battery cells include at least two parallel connections of nickel-metal-hydride battery cells.

21. A DC backup power supply system according to claim 10, wherein when a full-charged voltage of the battery is not greater than 48 V, a voltage at a DC line is set at a voltage at least equal to the voltage of the full-charged voltage of the battery.

22. A DC backup power supply system according to claim 10, wherein the rated output power is supplied for at least 6 minutes under the conditions that a temperature of the battery is at least 10° C., an internal impedance of the battery is not greater than twice an initial value and the battery is in a full-charged state.

* * * * *

UNITED STATES PATENT AND TRADEMARK OFFICE
CERTIFICATE OF CORRECTION

PATENT NO. : 7,495,415 B2
APPLICATION NO. : 11/130123
DATED : February 24, 2009
INVENTOR(S) : Kanouda et al.

It is certified that error appears in the above-identified patent and that said Letters Patent is hereby corrected as shown below:

Title page item (73), should read:

Assignee: Hitachi, Ltd., Tokyo (JP);
              Hitachi Maxell, Ltd., Osaka (JP);
              Hitachi Computer Peripherals Co., Ltd., Kanagawa-ken (JP)

Signed and Sealed this

Seventh Day of September, 2010

David J. Kappos
*Director of the United States Patent and Trademark Office*